(12) United States Patent
Cho et al.

(10) Patent No.: US 11,012,394 B2
(45) Date of Patent: May 18, 2021

(54) METHOD AND SYSTEM FOR PROVIDING SOCIAL MEDIA USING PARTITION FUNCTION

(71) Applicant: WAEM CO., LTD., Seoul (KR)

(72) Inventors: Rae Sung Cho, Seoul (KR); Dong Hyun Cho, Seoul (KR)

(73) Assignee: WAEM CO., LTD., Seoul (KR)

( * ) Notice: Subject to any disclaimer, the term of this patent is extended or adjusted under 35 U.S.C. 154(b) by 0 days.

(21) Appl. No.: 16/121,291

(22) Filed: Sep. 4, 2018

(65) Prior Publication Data

US 2019/0075066 A1 Mar. 7, 2019

(30) Foreign Application Priority Data

Sep. 4, 2017 (KR) .................... 10-2017-0112427

(51) Int. Cl.
*H04L 12/58* (2006.01)
*G06F 21/84* (2013.01)
*G06F 21/60* (2013.01)
*G06F 21/62* (2013.01)
*H04L 12/18* (2006.01)

(52) U.S. Cl.
CPC ............ *H04L 51/18* (2013.01); *G06F 21/602* (2013.01); *G06F 21/6209* (2013.01); *G06F 21/84* (2013.01); *H04L 12/1813* (2013.01); *H04L 51/04* (2013.01); *H04L 51/32* (2013.01); *H04L 51/10* (2013.01)

(58) Field of Classification Search
CPC ..... H04L 51/18; H04L 12/1813; H04L 51/10; H04L 51/32; H04L 51/04; H04L 9/0861; H04L 9/0894; G06F 21/6209; G06F 21/602; G06F 21/84; G06Q 50/01; G06Q 50/30
See application file for complete search history.

(56) References Cited

U.S. PATENT DOCUMENTS

| 9,553,833 | B2 * | 1/2017 | Chandrasekaran ... H04L 51/063 |
| 2003/0107584 | A1 * | 6/2003 | Clapper .................... G06T 5/20 345/619 |
| 2009/0259932 | A1 * | 10/2009 | Bank ................... G06F 21/6209 715/229 |

(Continued)

FOREIGN PATENT DOCUMENTS

KR 10-2014-0003960 A 1/2014
KR 10-2015-0061785 6/2015

*Primary Examiner* — Javier O Guzman
(74) *Attorney, Agent, or Firm* — Blank Rome LLP

(57) ABSTRACT

Disclosed are a method and system for providing social media using a partition function. A method of providing social media may include receiving sharing information input in one or more user terminals included in a chat room, assigning partitioned pieces generated by partitioning the received sharing information based on the number of users included in the chat room to user terminals included in the chat room, receiving a request for the reading of specific-processed sharing information from a specific user terminal included in the chat room, restoring the specific-processed sharing information based on the partitioned pieces received from the user terminals included in the chat room, and transmitting the restored sharing information to the user terminal that has requested the reading of the sharing information.

3 Claims, 15 Drawing Sheets

(56) References Cited

U.S. PATENT DOCUMENTS

| | | | | |
|---|---|---|---|---|
| 2011/0050602 | A1* | 3/2011 | Jeong | G06F 3/04883 |
| | | | | 345/173 |
| 2012/0290952 | A1* | 11/2012 | Paluch | H04N 21/4383 |
| | | | | 715/758 |
| 2014/0149891 | A1* | 5/2014 | Moy | G06Q 10/107 |
| | | | | 715/758 |
| 2014/0201527 | A1* | 7/2014 | Krivorot | G06F 21/6209 |
| | | | | 713/168 |
| 2014/0317660 | A1* | 10/2014 | Cheung | H04N 21/6175 |
| | | | | 725/44 |
| 2015/0172238 | A1* | 6/2015 | Ahmed | H04N 21/4788 |
| | | | | 709/217 |
| 2015/0350250 | A1* | 12/2015 | Brander | H04L 63/061 |
| | | | | 726/1 |
| 2016/0105463 | A1* | 4/2016 | Stuntebeck | H04L 51/04 |
| | | | | 726/1 |
| 2016/0132900 | A1* | 5/2016 | Duggal | G06Q 30/0201 |
| | | | | 705/7.29 |
| 2016/0132990 | A1* | 5/2016 | Zhang | H04W 4/18 |
| | | | | 345/646 |
| 2016/0234151 | A1* | 8/2016 | Son | H04L 51/34 |

* cited by examiner

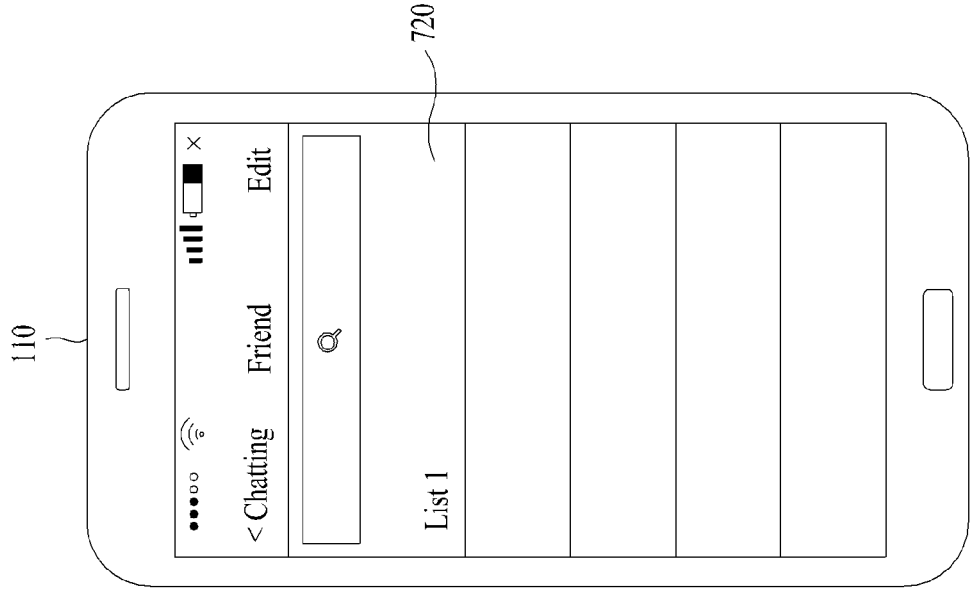
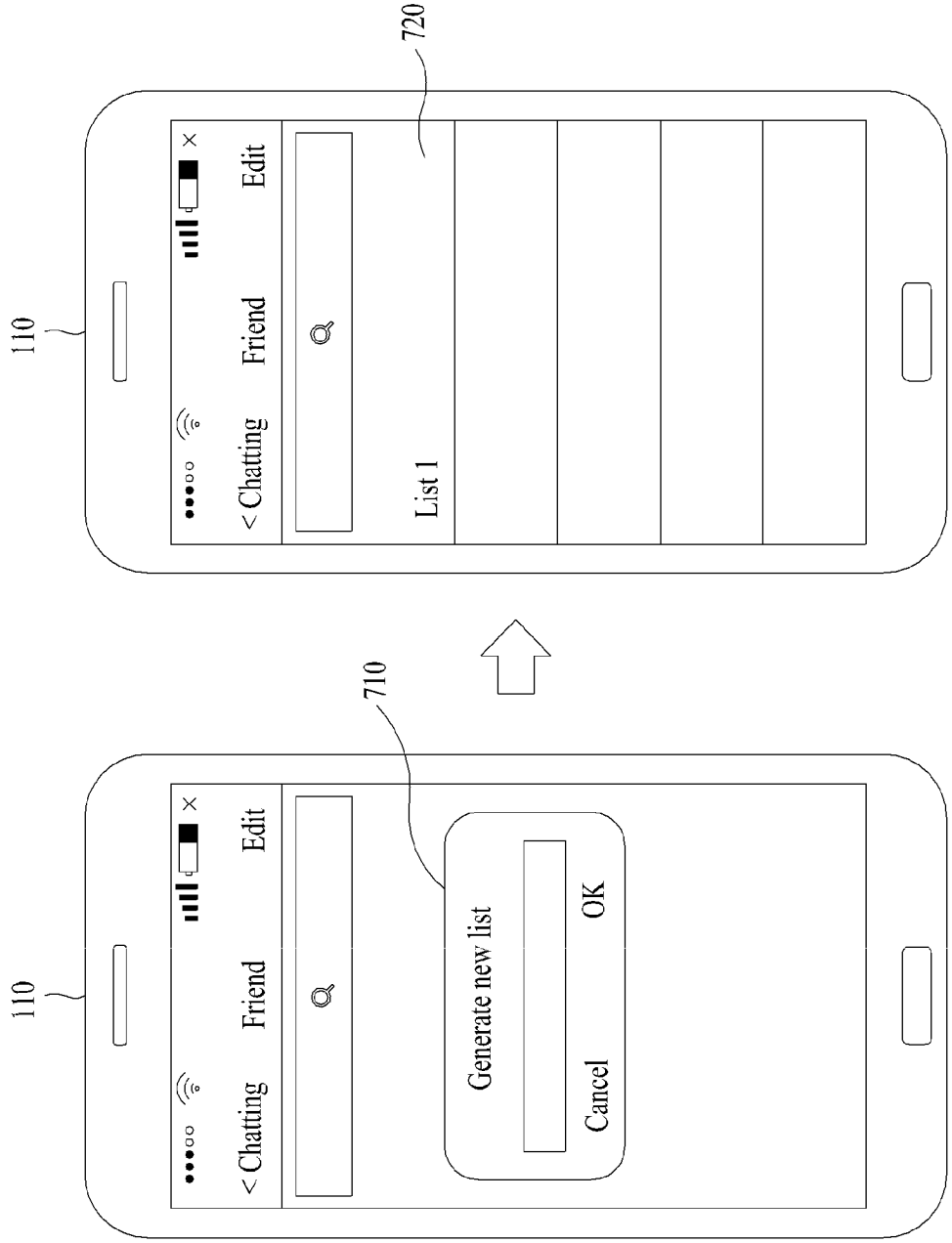

METHOD AND SYSTEM FOR PROVIDING SOCIAL MEDIA USING PARTITION FUNCTION

CROSS REFERENCE TO RELATED APPLICATION

The present application claims the benefit of Korean Patent Application No. 10-2017-0112427 filed in the Korean Intellectual Property Office on Sep. 4, 2017, the entire contents of which are incorporated herein by reference.

BACKGROUND OF THE INVENTION

1. Technical Field

The following description relates to a technology for providing services using a partition function of safely protecting sharing information, such as a photo, a still image and document.

2. Description of the Related Art

As a user can use a smart device at various places without being limited to the place with the development of the smart device, the user has become provided with various types of content, such as web surfing and moving image watching, through the smart device.

Furthermore, the user can be provided with mobile instant messenger (MIM) service and social network service (SNS) through apps of the smart device based on various platforms and can communicate with other persons through various paths. If information is shared with other persons through the smart device as described above, a risk of invasion of privacy increases because information input by a user is disclosed.

Korean Patent No. 10-1589111 (Jan. 21, 2016) "Method of providing security chatting service and system performing the same" discloses a technology in which if multiple users chat with each other in a chat room, although users do secret chats while a specific user leaves the chat room, the malicious use of the contents of chats can be prevented because the specific user can check only an encryption icon, but cannot check the contents of the chats although the specific user enters the chat room again.

SUMMARY OF THE INVENTION

Embodiment may provide a method and system for preventing the leakage of information using a partition function for sharing information including message transmitted and received in social media.

A method of providing social media is performed by a social media providing server, and may include receiving sharing information input in one or more user terminals included in a chat room, assigning partitioned pieces generated by partitioning the received sharing information based on the number of users included in the chat room to user terminals included in the chat room, receiving a request for the reading of specific-processed sharing information from a specific user terminal included in the chat room, restoring the specific-processed sharing information based on the partitioned pieces received from the user terminals included in the chat room, and transmitting the restored sharing information to the user terminal that has requested the reading of the sharing information.

Receiving sharing information input in one or more user terminals included in a chat room may include blur-processing the received sharing information and outputting the blur-processed sharing information to the chat room. The received sharing information may include at least one of a message comprising text data, a document file, a still image and a moving image.

Receiving sharing information input in one or more user terminals included in a chat room may include at least one of a method of outputting the received sharing information to the chat room for a set time, then blur-processing the received sharing information, and outputting the blur-processed sharing information, a method of immediately blur-processing the received sharing information and outputting the blur-processed sharing information to the chat room, a method of blur-processing the received sharing information and outputting the blur-processed sharing information when sharing information is additionally received in addition to the sharing information input in the chat room, and a method of blur-processing the received sharing information and outputting the blur-processed sharing information if a user terminal that has input the sharing information is excluded from the chat room.

The method may include generating the chat room by inviting at least one user with which the sharing information is to be shared in accessed social media when ID information related to each user is received.

Assigning partitioned pieces generated by partitioning the received sharing information based on the number of users included in the chat room to user terminals included in the chat room may include transmitting encrypted partitioned pieces obtained by encrypting the partitioned pieces using different encryption keys to the user terminals included in the chat room, and storing the encrypted partitioned pieces in the user terminals.

Restoring the sharing information may include requesting the user terminals included in the chat room to transmit the assigned partitioned pieces when approval to the reading of the specific-processed sharing information is received from the user terminals included in the chat room.

Restoring the sharing information may include receiving encryption keys along with the partitioned pieces from the user terminals included in the chat room, decrypting the partitioned pieces, and then restoring the specific-processed sharing information.

Restoring the sharing information may include at least one of a method of restoring each of pieces of the specific-processed sharing information, a method of restoring all of pieces of the specific-processed sharing information present in the chat room, and a method of restoring the specific-processed sharing information present in the chat room in a screen unit.

Receiving a request for the reading of specific-processed sharing information from a specific user terminal included in the chat room may include transmitting a message related to the request for the reading of the specific-processed sharing information to the user terminals included in the chat room and determining whether approval to the request for the reading of the specific-processed sharing information has been received from the user terminals included in the chat room.

Transmitting the restored sharing information to the user terminal that has requested the reading of the sharing information may include outputting the restored sharing information related to the sharing information to a chat room of the user terminal that has requested the reading of the sharing information.

A social media providing server may include a first reception unit configured to receive sharing information input in one or more user terminals included in a chat room, an allocation unit configured to assign partitioned pieces generated by partitioning the received sharing information based on the number of users included in the chat room to user terminals included in the chat room, a second reception unit configured to receive a request for the reading of specific-processed sharing information from a specific user terminal included in the chat room, a restoration unit configured to restore the specific-processed sharing information based on the partitioned pieces received from the user terminals included in the chat room, and a transmission unit configured to transmit the restored sharing information to the user terminal that has requested the reading of the sharing information.

The first reception unit may blur-process the received sharing information and output the blur-processed sharing information to the chat room. The received sharing information may include at least one of a message comprising text data, a document file, a still image and a moving image.

The allocation unit may transmit encrypted partitioned pieces obtained by encrypting the partitioned pieces using different encryption keys to the user terminals included in the chat room, and may store the encrypted partitioned pieces in the user terminals.

The restoration unit may request the user terminals included in the chat room to transmit the assigned partitioned pieces when approval to the reading of the specific-processed sharing information is received from the user terminals included in the chat room, may receive encryption keys along with the partitioned pieces from the user terminals included in the chat room, may decrypt the partitioned pieces, and may then restore the specific-processed sharing information.

The transmission unit may output the restored sharing information related to the sharing information to a chat room of the user terminal that has requested the reading of the sharing information.

BRIEF DESCRIPTION OF THE DRAWINGS

FIG. 7A is an example for illustrating a method of providing social media in a user terminal according to an embodiment.

FIG. 7B is another example for illustrating a method of providing social media in a user terminal according to an embodiment.

DETAILED DESCRIPTION

Hereinafter, embodiments are described in detail with reference to the accompanying drawings.

In the following embodiments, a technology for safely protecting sharing information (e.g., message), including at least one of a still image, a moving image, a document file, voice data and text data received from a specific user terminal, along with a counterpart user terminal in social media is described.

In the following embodiments, social media may mean a service in which users who have joined social networking services, such as Twitter, Facebook and chatting service, can widen personal relations while sharing information and opinions.

Figure 1:
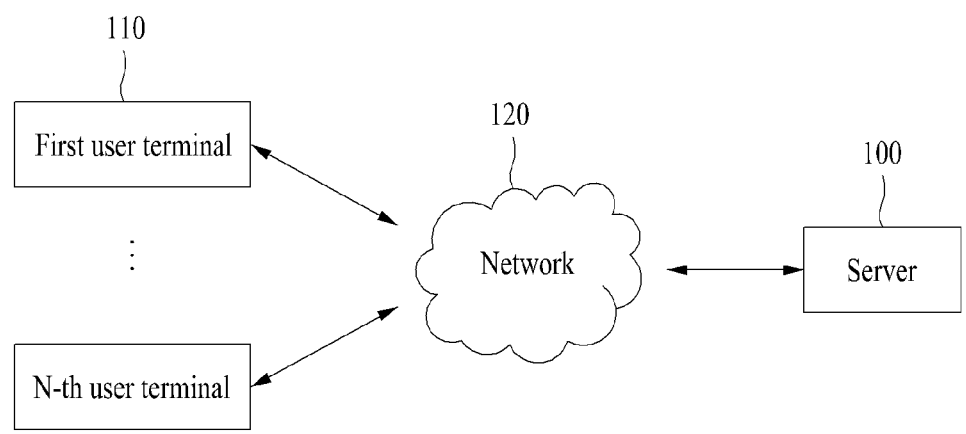
FIG. 1 is a diagram for illustrating an example of a network environment according to an embodiment.

FIG. 1 is a diagram for illustrating an example of a network environment according to an embodiment.

In FIG. 1, the network environment is illustrated as including user terminals 110, a social media providing server 100 and a network 120.

The user terminal 110 may mean all of terminal devices which can access a web/mobile site related to the social media providing server 100 or install and execute service-dedicated applications. In this case, the user terminal 110 may perform general service operations, such as service screen configurations, data input, data transmission/reception and data storage, under the control of a web/mobile site or a dedicated application. Examples of the user terminal 110 may include a smart phone, a tablet, a wearable computer, a personal computer (PC), a notebook and a laptop computer, but are not limited thereto. For example, the user terminal 110 may share information whose security has been maintained between a plurality of users in social media. The social media may be a chatting service environment in which users can share information. In the social media, users can open a chat room and share information. Security for the shared information can be maintained by partitioning the shared information and storing them in user terminals.

A communication method is not limited, and may include short-distance wireless communication between devices in addition to communication methods using communication networks (e.g., a mobile communication network, wired Internet, wireless Internet and a broadcast network) which may be included in the network 120. For example, the network 120 may include one or more specific networks of a personal area network (PAN), a local area network (LAN), a campus area network (CAN), a metropolitan area network (MAN), a wide area network (WAN), a broadband network (BBN) and Internet. Furthermore, the network 120 may include one or more of network topologies, including a bus network, a star network, a ring network, a mesh network, a star-bus network, and a tree or hierarchical network, but is not limited thereto.

The user terminal 110 may interface with the social media providing server 100 over the network 120. The social media providing server 100 communicates with the user terminal 110 over the network 120 and may be implemented using a computer device or a plurality of computer devices which provide instructions, code, files, content and services. For example, the social media providing server 100 may be a social media providing server that provides social media using a partition function to the user terminal 110 accessed thereto over the network 120.

Figure 2:
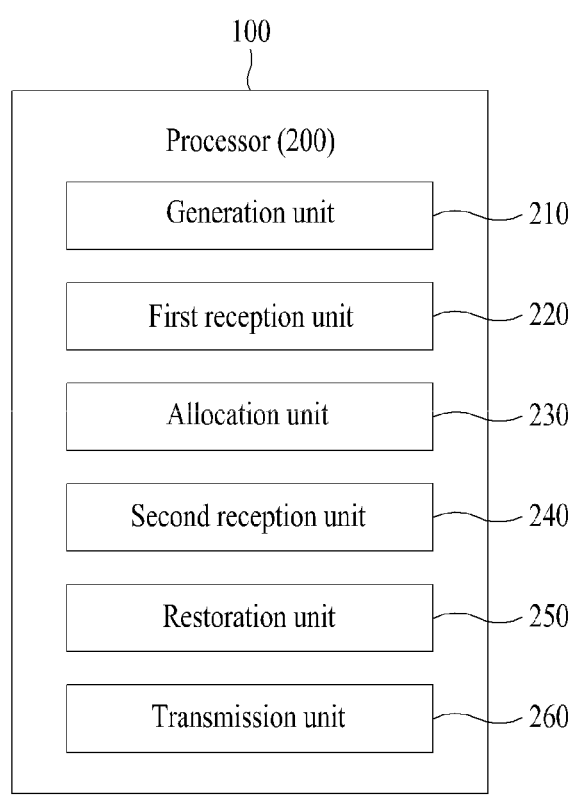
FIG. 2 is a block diagram for illustrating the internal configuration of a social media providing server according to an embodiment.
Figure 3:
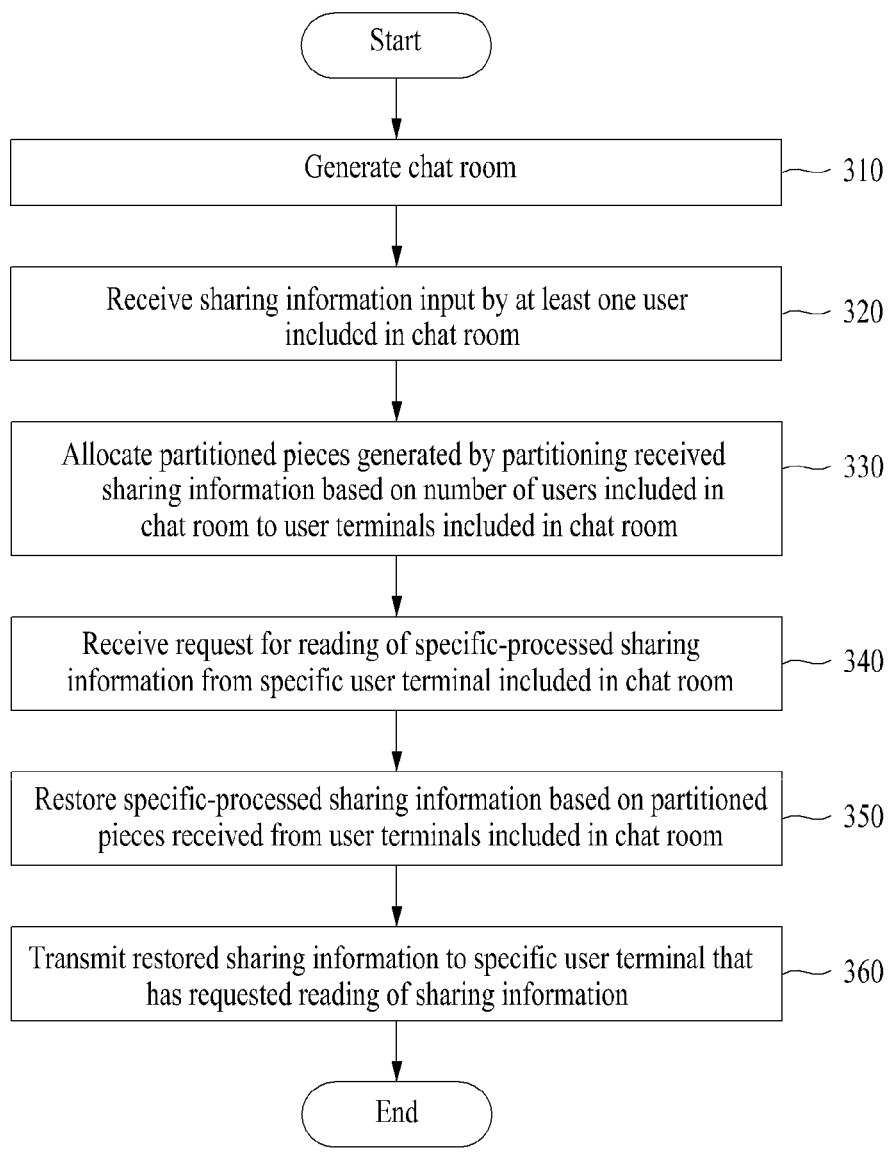
FIG. 3 is a flowchart for illustrating a method for the social media providing server to provide social media according to an embodiment.

FIG. 2 is a block diagram for illustrating the internal configuration of the social media providing server according to an embodiment. FIG. 3 is a flowchart for illustrating a method for the social media providing server to provide social media according to an embodiment.

The processor 200 of the social media providing server 100 may provide a partition function in the social media. The partition function may mean that sharing information shared in the social media is partitioned. The processor 200 of the social media providing server 100 may include a generation unit 210, a first reception unit 220, an allocation unit 230, a second reception unit 240, a restoration unit 250 and a transmission unit 260.

The processor 200 and the elements of the processor 200 may control the social media providing server so that it performs steps 310 to 360 included in the method of providing social media shown in FIG. 3. In this case, the processor 200 and the elements of the processor 200 may be implemented to execute instructions according to the code of an operating system installed on memory and the code of at least one program. In this case, the elements of the processor 200 may be expressions of different functions performed by the processor 200 in response to a control command provided by program code stored in the social media providing server 100.

The processor 200 may load program code, stored in a file of a program for the method of providing social media, onto the memory. For example, when a program is executed in the social media providing server 100, the processor may control the social media providing server so that it loads program code from a file of a program to the memory under the control of an operating system.

In step 310, the generation unit 210 may generate a chat room. The generation unit 210 may generate the chat room by inviting at least one user who wants to share sharing information in social media accessed as ID information related to each user is input. In this case, the chat room may be open in a messenger service in which information can be shared between users.

In step 320, the first reception unit 220 may receive sharing information input by at least one user included in the chat room. The first reception unit 220 may perform specific processing on the received sharing information and output the specific-processed sharing information to the chat room. In this case, the contents of the sharing information may be blur-processed so that it is difficult to read the contents. Furthermore, the contents of the sharing information are not output, but whether entered sharing information is present or not may be made not open to the public. For example, sharing information including text data, a still image or a moving image received from users in the chat room may be recognized as messages, enabling chats.

In step 330, the allocation unit 230 may allocate partitioned pieces, generated by partitioning the received sharing information based on the number of users included in the chat room, to user terminals included in the chat room. The allocation unit 230 may transmit encrypted partitioned pieces, obtained by encrypting the partitioned pieces using different encryption keys, to the user terminals included in the chat room, and may store the encrypted partitioned pieces in the user terminals.

In step 340, the second reception unit 240 may receive a request for the reading of the specific-processed sharing information from a specific user terminal included in the chat room. The second reception unit 240 may transmit a message related to the request for the reading of the specific-processed sharing information to each of the user terminals included in the chat room, and may determine whether the request for the reading of the specific-processed sharing information is accepted by each of the user terminals included in the chat room.

In step 350, the restoration unit 250 may restore the specific-processed sharing information based on the partitioned pieces received from the user terminals included in the chat room. If the request for the reading of the specific-processed sharing information is accepted by each of the user terminals included in the chat room, the restoration unit 250 may request the transmission of the partitioned pieces allocated to the user terminals included in the chat room, may receive encryption keys corresponding to the user terminals along with the partitioned pieces from the user terminals included in the chat room, may decrypt the partitioned pieces, and may restore the specific-processed sharing information.

In step 360, the transmission unit 260 may transmit the restored sharing information to the specific user terminal that has requested the reading of the sharing information. The transmission unit 260 may output the restored sharing information related to the sharing information to the chat room of the specific user terminal that has requested the reading of the sharing information.

Figure 4:
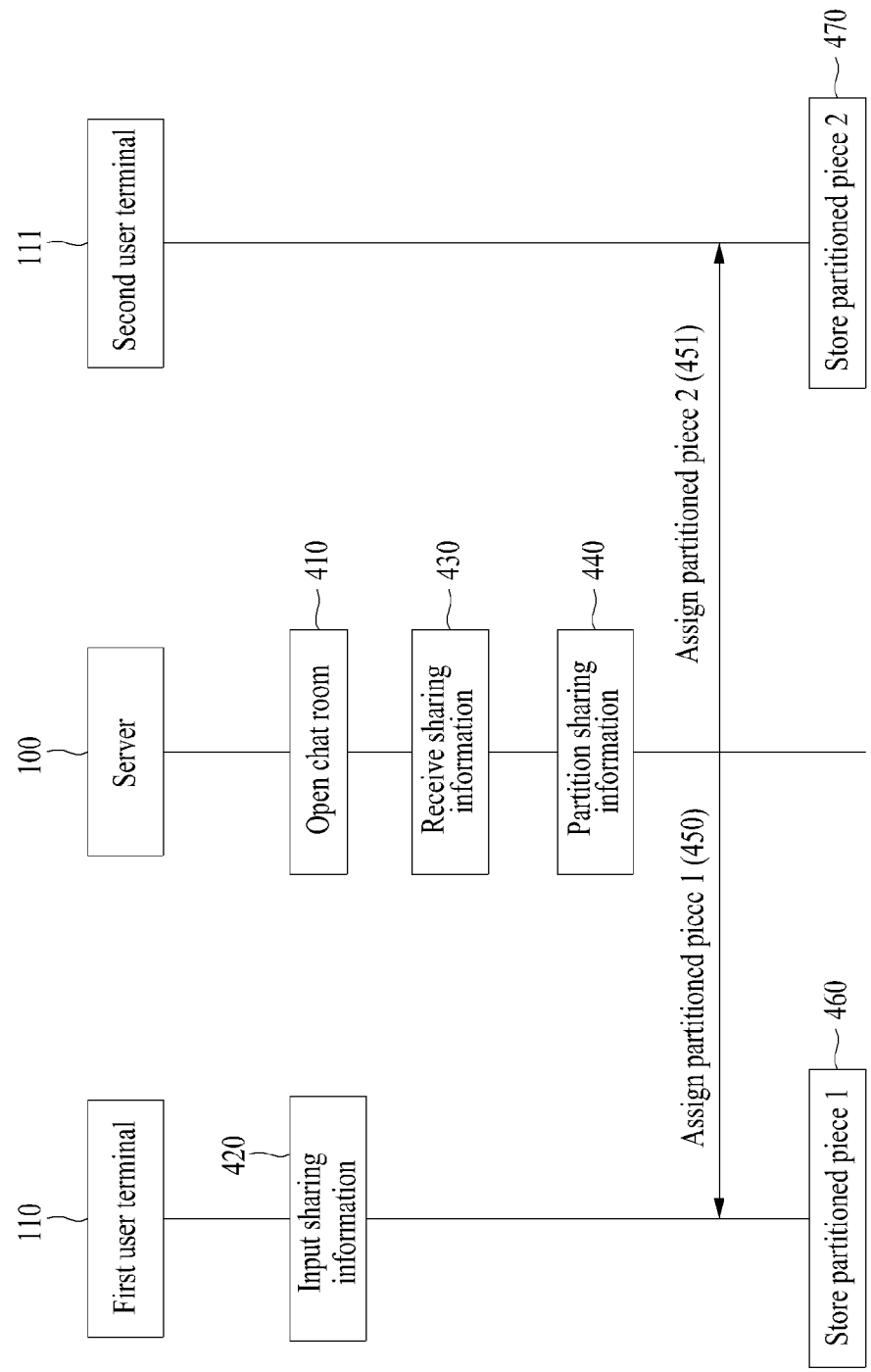
FIG. 4 is a diagram for illustrating an example of a process of partitioning sharing information according to an embodiment.

FIG. 4 is a diagram for illustrating an example of a process of partitioning sharing information according to an embodiment.

To partition and store sharing information transmitted and received between a plurality of users in order to maintain security for the sharing information in social media is described. For more detailed description, a process of partitioning sharing information transmitted and received between a first user terminal 110 and a second user terminal 111 is described with reference to FIG. 4.

A chat room including the first user terminal 110 and the second user terminal 111 may be open (410). When at least one user from the first user terminal 110 is selected, the social media providing server 100 may automatically invite the selected users to the chat room. Alternatively, after a chat room is generated, the first user terminal may invite users to the generated chat room. In this case, the chat room may include at least two users, and other users may be further added to the chat room by the invited users.

The first user terminal 110 may input sharing information in the chat room (420). In this case, the sharing information may be present in the form of text data (e.g., a symbol, emoticon, and numerical and alphabetic information), a document file, a still image and a moving image, in various manners, and may also include photographing data instantly photographed by a user. For example, when the first user terminal 110 calls a document file, a still image, a moving image or voice data stored in the first user terminal 110, the called information may be uploaded to the chat room. Furthermore, the first user terminal 110 may upload sharing information generated while operating in conjunction with a function, such as photographing, recording or document writing, to the chat room.

The social media providing server 100 may receive the sharing information input by the first user terminal 110 (430). In this case, the social media providing server 100 may automatically delete the sharing information input by the first user terminal 110 when sharing information input by the first user terminal 110 is received. For example, when the first user terminal 110 inputs a message including text data, the social media providing server 100 may output the message of the first user terminal 110 to the chat room. In this case, the social media providing server 100 may change the message received from the first user terminal 110 to a closed state after a preset time so that the contents of the message of the first user terminal 110 are not displayed in each of user terminals.

The social media providing server 100 may partition the sharing information received from the first user terminal 110 based on the number of users N (N is a natural number) included in the chat room (440). Alternatively, the social media providing server 100 may partition the sharing information based on the number of users N−1 (N is a natural number) who belong to users included in the chat room, but does not include a user who has entered the message. When the first user terminal 110 and the second user terminal 111 included in the chat room are identified, the social media providing server 100 may partition the sharing information into partitioned pieces of the same ratio or different ratios. After the sharing information is partitioned, the social media providing server 100 may maintain information related to the partitioning of the sharing information as information necessary to restore the partitioned sharing information by matching the information with the sharing information.

When the sharing information is partitioned into a partitioned piece 1 and a partitioned piece 2, for example, the social media providing server 100 may assign the partitioned piece 1 to the first user terminal 110 and the partitioned piece 2 to the second user terminal 111 (450 and 451). In this case, the sharing information is partitioned in a form in which the original photographing information cannot be restored by the partitioned pieces themselves.

In assigning the partitioned pieces, the social media providing server 100 may transmit encrypted partitioned pieces, obtained by encrypting the partitioned pieces using different encryption keys, to the first user terminal 110 and the second user terminal 111, respectively. In this case, the encryption keys used for encryption may be the same or different for the partitioned pieces. The social media providing server 100 may transmit the encryption keys used for the encryption of the partitioned pieces to the user terminals so that the encryption keys and the partitioned pieces are stored together. Alternatively, the social media providing server 100 may store the encryption keys therein without transmitting them to the user terminals. Furthermore, the encryption keys used for the encryption of the partitioned pieces may be stored in storage places different from those of the partitioned pieces.

The first user terminal 110 may store the partitioned piece 1 (460), and the second user terminal may store the partitioned piece 2 (470).

Figure 5:
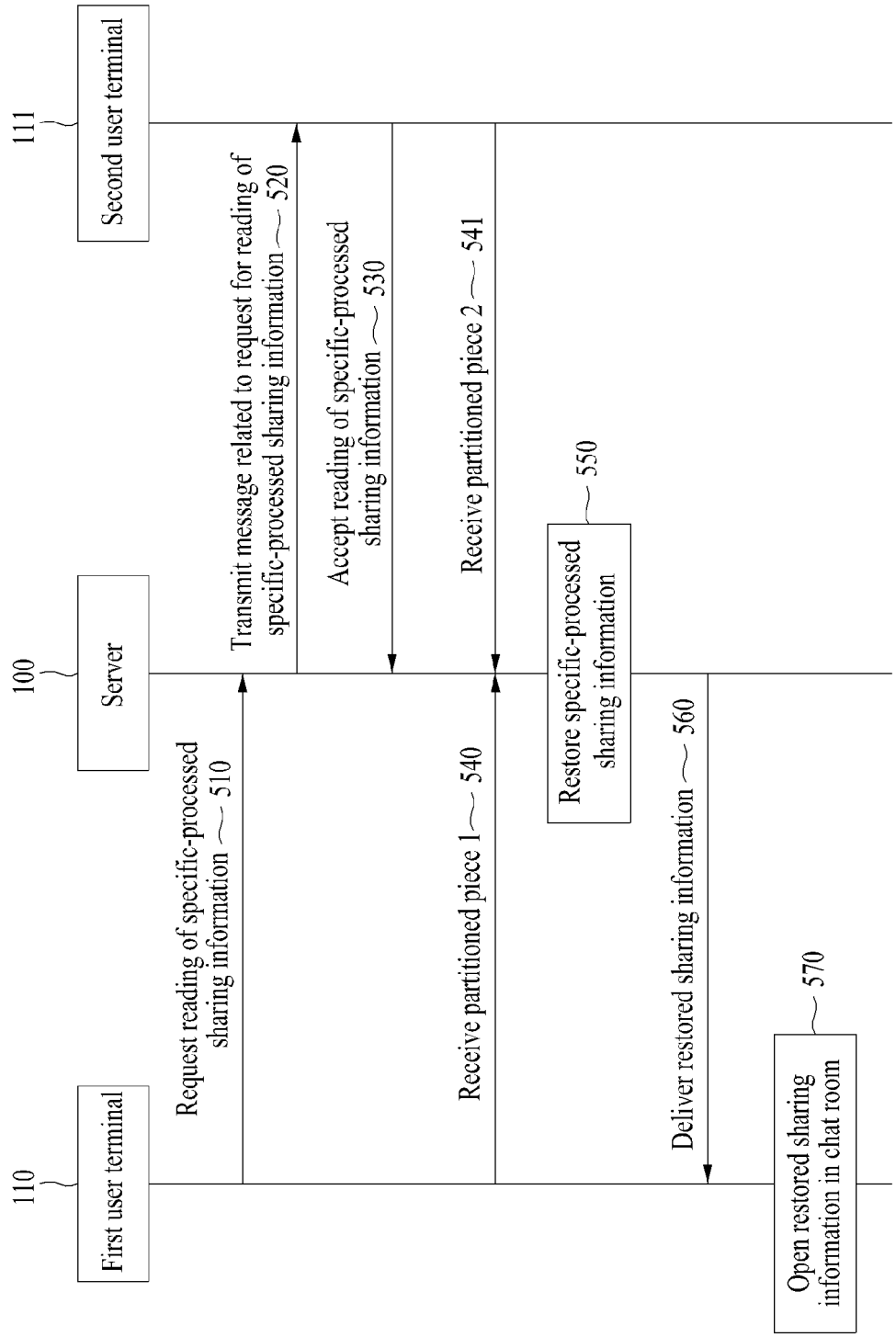
FIG. 5 is a diagram for illustrating an example of a process of restoring sharing information according to an embodiment.

FIG. 5 is a diagram for illustrating an example of a process of restoring sharing information according to an embodiment.

A process of restoring sharing information transmitted and received between the first user terminal 110 and the second user terminal 111 included in a chat room as in the description of FIG. 4 is described. A request for the reading of sharing information (e.g., message) transmitted and received in a chat room may be received from the first user terminal 110 (510). In this case, the sharing information may be specific-processed sharing information. For example, the sharing information may be blur-processed and may be processed in a closed state. When the request for the reading of the specific-processed sharing information is received from the first user terminal 110, the social media providing server 100 may transmit a message related to the request for the reading of the specific-processed sharing information to a user terminal (e.g., second user terminal 111) included in the chat room (520). Approval to the reading of the specific-processed sharing information may be received from the second user terminal 111 (530).

When approval to the reading of the specific-processed sharing information is received from the second user terminal 111, the social media providing server 100 may request the first user terminal 110 and the second user terminal 111 to transmit partitioned pieces stored in the respective user terminals. The social media providing server 100 may receive a partitioned piece 1, stored in the first user terminal, from the first user terminal 110, and may receive a partitioned piece 2, stored in the second user terminal, from the second user terminal 111 (540 and 541). If the second user terminal 111 does not approve the restoration of the specific-processed sharing information, the social media providing server 100 may deliver unavailability notification for the corresponding sharing information to the first user terminal 110 because the requested partitioned piece 2 of the sharing information cannot be secured and thus restoration to the original information is impossible. In this case, if a partitioned piece related to the sharing information has been encrypted, the social media providing server 100 may request the transmission of a corresponding encryption key in the process of requesting the partitioned piece of the sharing information. Accordingly, the social media providing server 100 may receive the partitioned piece 2 and an encryption key for the partitioned piece 2 from the second user terminal, and may decrypt the partitioned piece 2. Alternatively, if an encryption key has been stored in the social media providing server 100, the social media providing server 100 may read the encryption key for a corresponding partitioned piece and perform decryption on the partitioned piece.

When all the partitioned piece 1 and the partitioned piece 2 are received, the social media providing server 100 may restore the original sharing information using the partitioned piece 1 and the partitioned piece 2 (550). The social media providing server 100 may deliver the restored sharing information to the first user terminal 110 that has requested the reading of the sharing information (560). The restored sharing information may be made open in the chat room of the first user terminal 110. In this case, when the restored sharing information is transmitted to the first user terminal that has requested the use of the sharing information, the social media providing server 100 may process the restored sharing information using a reproduction prevention technique (e.g., watermark technology) so that duplication, such as a copy of the restored sharing information, is impossible. Accordingly, sharing information containing contents to be protected between users can be restored and used only when mutual agreement is present between the users.

The social media providing server according to an embodiment may partition sharing information into pieces. Each of user terminals included in a chat room may retain and share each of the pieces. The user terminals may check the sharing information under permission between users included in the chat room. If a counterpart does not permission the sharing of the sharing information, the check and drainage of the sharing information are impossible.

FIGS. 6 to 10 are examples for illustrating a method of providing social media in a user terminal according to an embodiment.

Figure 6:
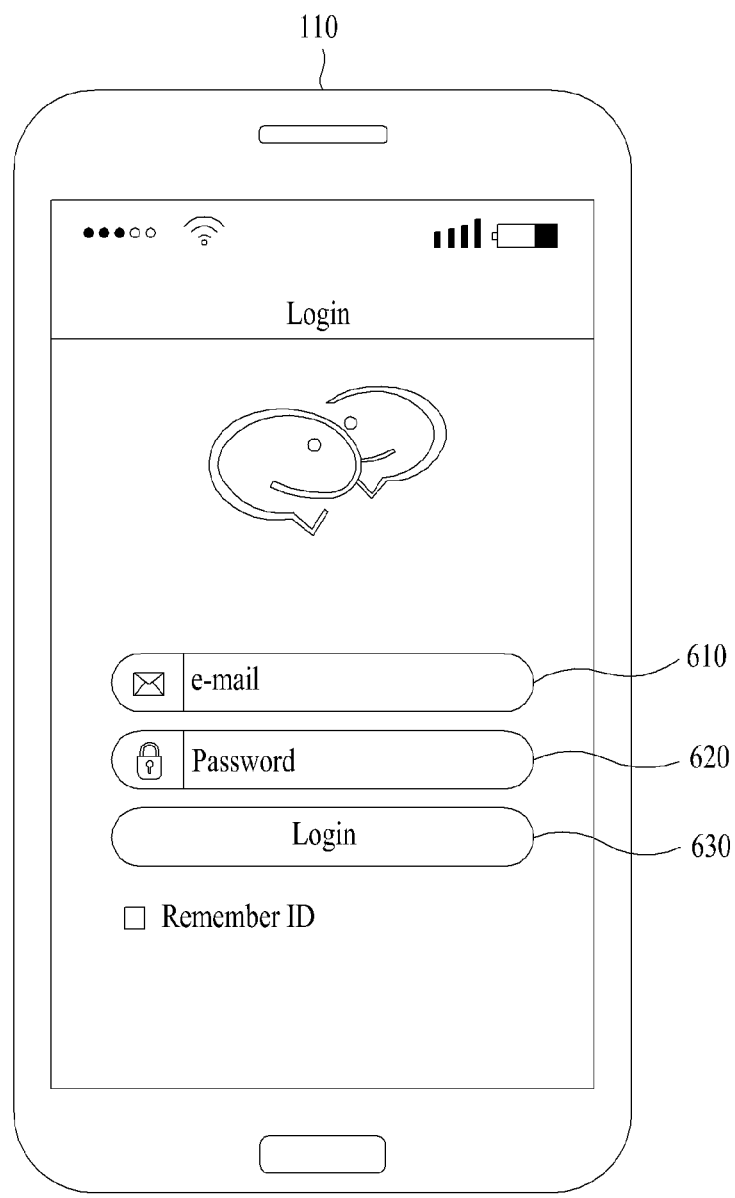
FIG. 6 is an example for illustrating a method of providing social media in a user terminal according to an embodiment.

FIG. 6 is a diagram for illustrating a process of executing social media in a user terminal. A user may enter ID information related to the user in order to access social media through the user terminal 110, and may select a user interface 630 for login. For example, when an ID (e-mail address) and a password are entered as the ID information related to the user, the social media providing server may perform user authentication by comparing the entered ID information with ID information stored in the social media providing server. If the entered ID information of the user is identical with the stored ID information, the social media providing server may permit the user to access the social media. If the entered ID information of the user is not identical with the stored ID information, the social media providing server may not permit access to the social media.

For example, a process of joining the social media in the user terminal may be performed. When the user terminal joins the social media, an authentication server for processing user authentication, a one-time password (OTP) server for generating a password, and the social media providing server may operate. The social media providing server may request a new OTP from the authentication server in response to a join request from the user terminal. The social media providing server may deliver a user ID for joining the social media to the authentication server when it requests the new OTP. The authentication server may request the new OTP from the OTP server in response to the new OTP request of the social media providing server. The OTP server may randomly generate an OTP in response to the new OTP request of the authentication server, and may transmit the generated OTP to the authentication server. In this case, the OTP may be automatically generated freely regardless of its length and whether it includes a special character. The authentication server may store the OTP, received from the OTP server, in a database included in the authentication server or connected to the authentication server. The authentication server may store the OTP received from the OTP server in response to the new OTP request of the social media providing server along with the user ID received from the social media providing server, and may generate two OTPs by partitioning the OTP received from the OTP server. For example, if an OTP received from the OTP server is {1234567890}, the authentication server may partition the received OTP into a partitioned OTP1 {12345} and a partitioned OTP2 {67890}. The authentication server may transmit the partitioned OTP1 and the partitioned OTP2 to the social media providing server that has requested the new OTP. The social media providing server may receive the partitioned OTP1 and the partitioned OTP2 from the authentication server, and may store one of the two OTPs in the database included in the social media providing server or connected to the social media providing server. In this case, the social media providing server may store a user ID and device information included in the join request of the user terminal in the database connected to the social media providing server by matching the user ID and device information with the partitioned OTP1. The social media providing server may transmit the other of the partitioned OTP1 and partitioned OTP 2 received from the authentication server, for example, the partitioned OTP2 to the user terminal that has made the join request. The user terminal may store the partitioned OTP2, received from the social media providing server in response to the join request, in a database included in the user terminal or connected to the user terminal. In this case, the user terminal may store the user ID entered by the user and the device information of the user terminal in the database connected to the user terminal by matching the user ID and device information with the partitioned OTP2. The user terminal may complete the joining procedure by receiving part (e.g., partitioned OTP2) of the two OTPs from the social media providing server with respect to the join request. Accordingly, an OTP may be automatically generated in response to a join request from the user terminal and assigned to the user terminal.

When the user terminal joins the social media as described above, a login procedure may be performed. If the social media is to be accessed using the user terminal, any information does not need to be input as well as the user ID, that is, information for user authentication. More specifically, the user terminal may transmit an access request for the social media to the social media providing server. In this case, the user terminal may automatically read the device information, user ID and partitioned OTP 2 stored in the database connected to the user terminal, and may transmit the access request, including the information, to the social media providing server. When the access request is received from the user terminal, the service providing server may read the partitioned OTP1, matched with the device information and user ID included in the access request, from the database connected to the service providing server, and may request OTP authentication verification by transmitting the read partitioned OTP1 to the authentication server along with the partitioned OTP2 included in the access request. In this case, the social media providing server may deliver the user ID whose access has been requested when the OTP authentication verification request is made to the authentication server. The authentication server may restore the partitioned OTP1 and OTP2 received from the social media providing server, and may perform OTP verification by comparing the restored OTP with the OTP stored in the database connected to the authentication server. In this case, the authentication server may receive the user ID from the social media providing server along with the OTP authentication verification request, may read an OPT that belongs to OTPs stored in the database connected to the authentication server and that is matched with the received user ID, and may compare the read OTP with the restored OTP. If the OTP verification is successful, the authentication server may request a new OTP from the OTP server again. The OTP server may randomly generate an OTP in response to the new OTP request of the authentication server, and may transmit the generated OTP to the authentication server. The authentication server may store the OTP received from the OTP server in the database connected to the authentication server. In this case, the authentication server may discard an old OTP stored in relation to the user ID, may store the OTP received from the OTP server, and may generate two OTPs (i.e., partitioned OTP1 and partitioned OTP2) by partitioning the stored OTP. If the OTP verification is successful, the authentication server may transmit the partitioned OTP1 and the partitioned OTP2 to the social media providing server. If the OTP verification fails, the authentication server may transmit verification failure data to the social media providing server. If the OTP verification is successful, the social media providing server permits the access of the user terminal to the social media, and may store one of the partitioned OTP1 and the partitioned OTP2 received from the authentication server, for example, the partitioned OTP1 to the database connected to the social media providing server. In this case, the social media providing server may discard the old partitioned OTP1 and store the new partitioned OTP1 in relation to the user ID and device information of the user terminal. Furthermore, if the OTP verification fails, the social media providing server performs OTP verification failure processing. If the OTP verification is successful, the social media providing server may transmit the other of the partitioned OTP1 and partitioned OTP2 received from the authentication server, for example, the partitioned OTP2 to the user terminal. If the OTP verification fails, the social media providing server may transmit verification failure data to the user terminal. The user terminal may store the partitioned OTP2, received from the social media providing server, in the database connected to the user terminal. In this case, the user terminal may discard the old partitioned OTP2 stored in the database connected to the user terminal and store the new partitioned OTP2 as soon as the user terminal accesses the social media providing server.

Referring to FIGS. 7A and 7B, when the user terminal 110 accesses social media, it may generate a chat room in which sharing information is to be shared. The user terminal 110 may input the name of the chat room through a chat room user interface 710 for generating a chat room. The chat room may be generated based on the name input by the user terminal 110 or selected users may be invited to the chat room when at least one user is selected by the user terminal 110. For example, when at least one user is selected by the first user terminal, the selected users automatically participate in the chat room. Alternatively, when users are invited to the chat room, they may participate in the chat room or may not participate in the chat room depending on the selection of the invited users. In this case, the chat room may include two or more users. Other users may continue to be added to the chat room depending on the selection of invited users.

In this case, when a plurality of chat rooms is generated by the user terminal 110, a chat room list 720 may be displayed in the user terminal 100. For example, if a plurality of chat rooms is generated in the user terminal 110, a plurality of chat rooms may be displayed in the chat room list. When at least one of the chat rooms is selected, the contents of chats transmitted and received in the chat rooms may be displayed.

FIGS. 8A through 8D are diagrams for illustrating methods of displaying sharing information transmitted and received in a chat room. The social media providing server may output sharing information between users included in a chat room to the user terminal 110. For example, when sharing information is input through a message input user interface 830 from the user terminal 110, the sharing information may be transmitted and received between user terminals included in a chat room in the form of messages. In this case, the length or size of a message displayed in the chat room may be differently displayed depending on the amount of data included in sharing information received from the user terminal 110. ID information may be assigned to each of pieces of sharing information. As described above, the social media providing server may assign ID information to each of pieces of sharing information and deliver partitioned sharing information and ID information to each user terminal. Each user terminal may have stored the partitioned sharing information and the ID information together. Furthermore, if specific-processed sharing information is to be restored subsequently, the original sharing information can be restored more precisely and conveniently by receiving ID information and related to the sharing information and partitioned sharing information from each user terminal.

Figure 8B:
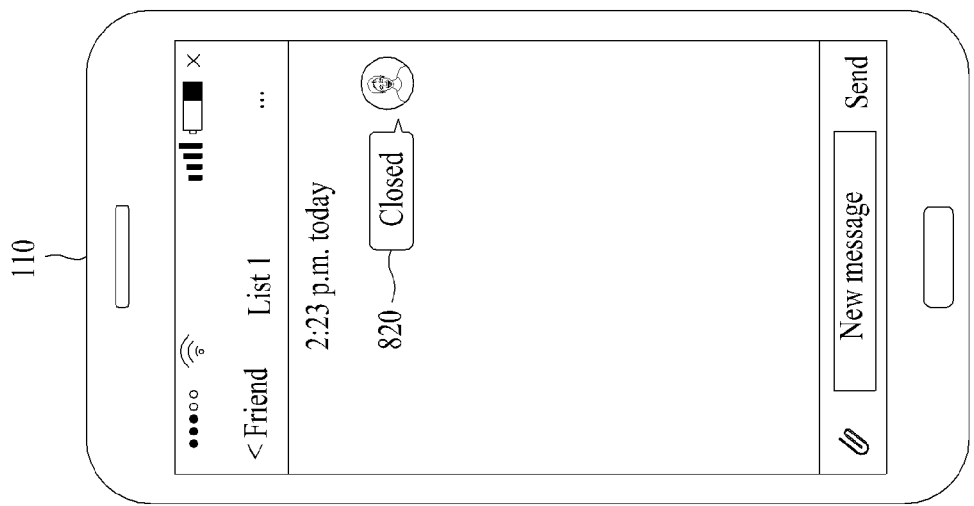
FIG. 8B an example for illustrating a method of providing social media in a user terminal according to an embodiment in which sharing information is text data.
Figure 8A:
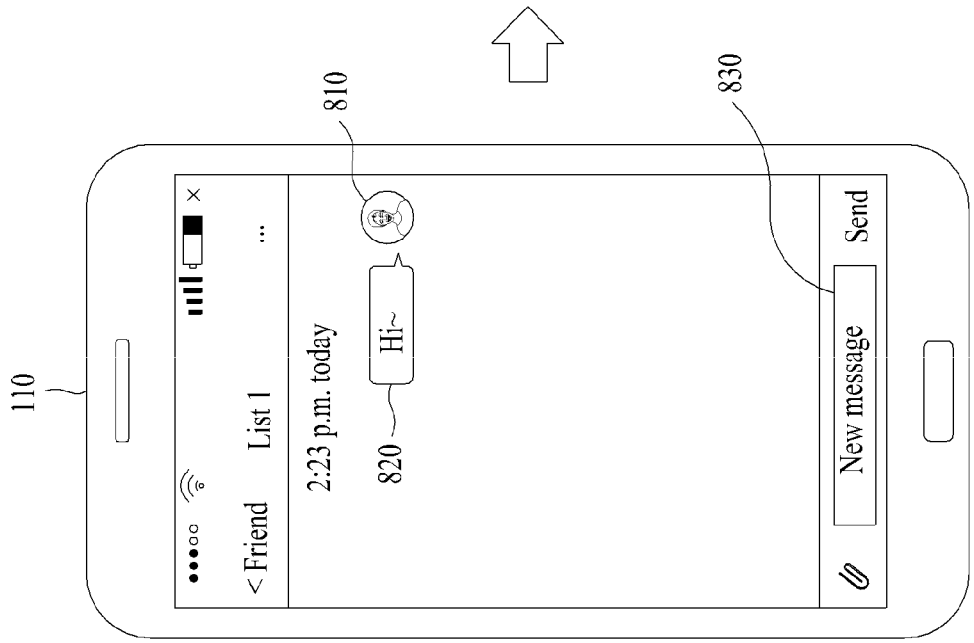
FIG. 8A is an example for illustrating a method of providing social media in a user terminal according to an embodiment in which sharing information is text data.
Figure 8D:
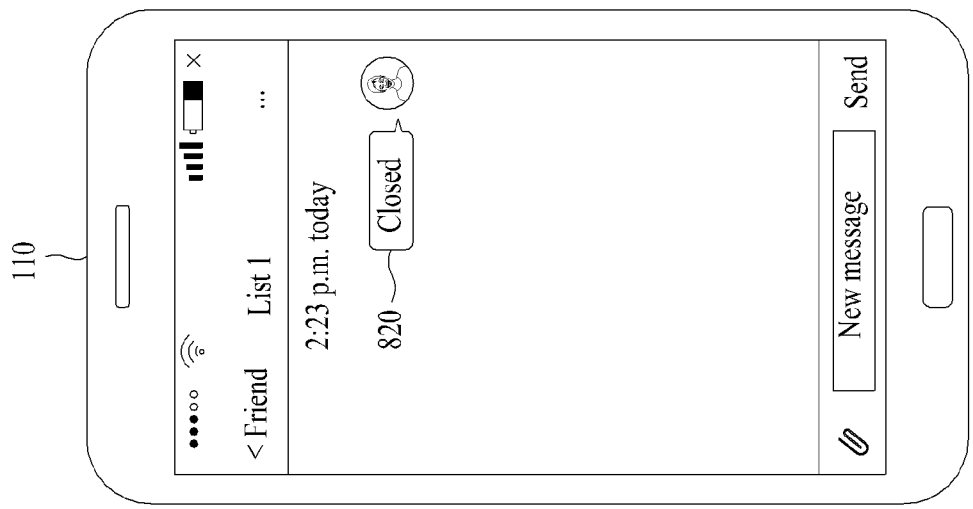
FIG. 8D is an example for illustrating a method of providing social media in a user terminal according to an embodiment in which sharing information is a moving image.
Figure 8C:
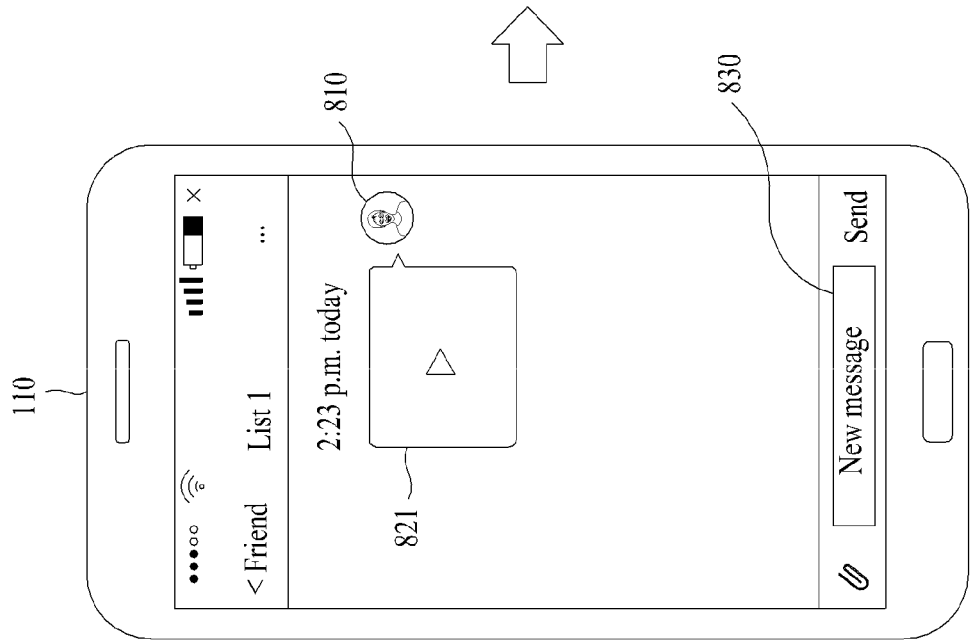
FIG. 8C is an example for illustrating a method of providing social media in a user terminal according to an embodiment in which sharing information is a moving image.

The social media providing server may perform blur processing on sharing information 820, received from a specific user 810, in a chat room. Alternatively, the social media providing server may change the sharing information 829 into sharing information 821 of a closed state. FIG. 8A shows an example in which sharing information is text data. FIG. 8B shows an example in which sharing information is a moving image. In this case, data (e.g., a message including text data, a document file, a still image or a moving image) received through the input user interface 830 provided in the chat room may be recognized as a message.

Furthermore, FIGS. 13A through 13D show examples in which blur processing has been performed on sharing information received from the specific user 811. As in FIGS. 13A through 13D, the blur processing may be performed in various manners. In this case, a blur processing method may be set by a user as shown In FIGS. 13A through 13D. Furthermore, the intensity (e.g., weakly or strongly) of blur processing may be set. For example, the intensity of blur processing set in a user terminal may be applied to sharing information, and the sharing information may be displayed in a chat room as a message.

Figure 11:
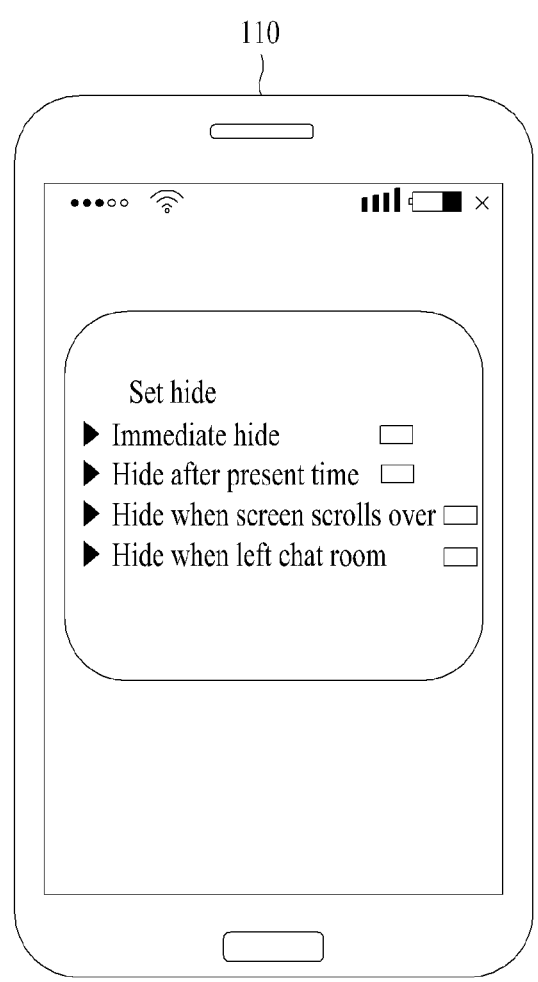
FIG. 11 is an example showing a user interface in which a hide function for sharing information is set in a user terminal according to an embodiment.

FIG. 11 shows an example of a user interface in which a hide function for sharing information is set in a user terminal. In this case, the term "hide" may mean that blur processing is performed on sharing information or may mean that sharing information is changed into a closed state. In this case, a user may select whether sharing information will be closed or blur-processed.

For example, the social media providing server may provide a user interface in which a hide function for sharing information is set through social media of a user terminal. In other words, if social media is a chatting service, the social media providing server may provide the space in which a hide function for sharing information performed in a chat room provided by the chatting service is set. More specifically, the social media providing server may provide a user interface regarding whether sharing information received from the user terminal 110 will be immediately hidden, whether sharing information received from the user terminal 110 will be hidden after a preset time (e.g., after 3 seconds since sharing information is input), whether sharing information received from the user terminal 110 will be hidden when the sharing information is not displayed on the display of the user terminal 110 (e.g., when sharing information shared in a chat room continues to be received and is not displayed on a display or when another sharing information is received in addition to sharing information received from a user terminal in a chat room), or whether sharing information received from the user terminal 110 will be hidden when the sharing information is not present in a chat room (e.g., when a corresponding user left the chat room) after the sharing information is received from the user terminal 110 in the chat room. The user terminal 110 may set the hide function through such a user interface. Accordingly, a set hide function may be applied to sharing information input in a chat room.

Figure 9A:
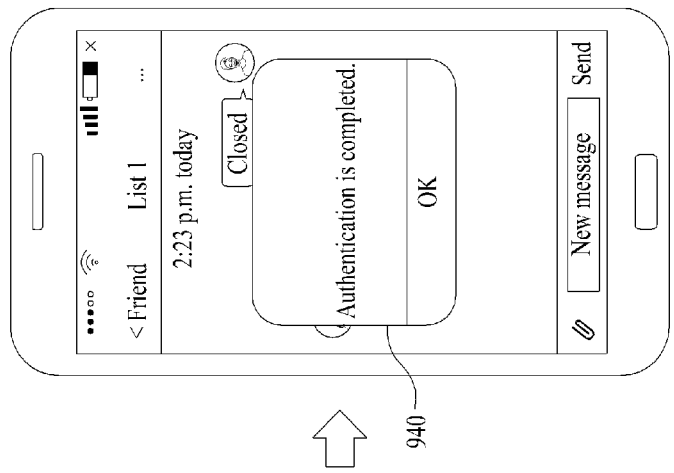
FIG. 9A is an example for illustrating a method of providing social media in a user terminal according to an embodiment in which specific processing may be performed on sharing information input by users in a chat room.
Figure 9B:
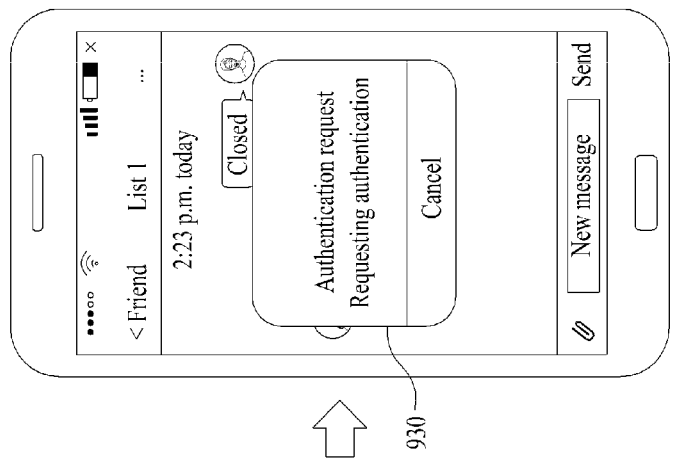
FIG. 9B is an example for illustrating a method of providing social media in a user terminal according to an embodiment in which specific processing may be performed on sharing information input by users in a chat room.
Figure 9C:
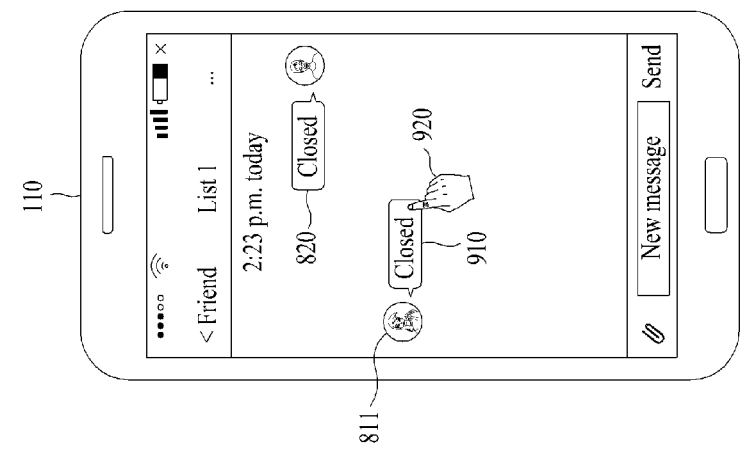
FIG. 9C is an example for illustrating a method of providing social media in a user terminal according to an embodiment in which specific processing may be performed on sharing information input by users in a chat room.

Referring to FIG. 9, specific processing may be performed on sharing information input by users in a chat room. In this case, the specific-processed sharing information may be blur-processed or changed into a closed state. A method of restoring specific-processed sharing information as described above is described below. Sharing information changed into a closed state is described as an example with reference to FIG. 9.

When sharing information input by users is displayed as closed sharing information 910 in a chat room, the closed sharing information 910 may be selected (920) by a specific user. The reading of the selected closed information 910 may be requested. The user terminal 110 may receive the request for the reading of the closed sharing information from the specific user included in the chat room. In this case, the requested closed sharing information may be sharing information written by the specific user or may be sharing information written by another person included in the chat room. The social media providing server may transmit a message related to the request for the reading of the closed sharing information to each of user terminals included in the chat room.

A message to query whether the requested closed sharing information will be approved may be displayed in each of the user terminals included in the chat room. Each user terminal may input a command that accepts or rejects the message to query whether the requested closed sharing information will be approved. The social media providing server may determine whether approval to the request for the reading of the closed sharing information has been received from each of the user terminals. At the same time, the social media providing server may output a message 930 to notify a corresponding user terminal that has requested the reading of the sharing information that authentication for the approval to the request for the reading of the closed sharing information is requested from other user terminals. When approval to the request for the reading of the closed sharing information is received from other user terminals, the social media providing server may output a message 940 that provides notification that authentication has been completed to a user terminal from which the authentication has been requested. If any one of the user terminals included in the chat room does not accept the request for the reading of the closed sharing information, the restoration of the closed sharing information is impossible.

When approval to the request for the reading of the closed sharing information is received from each of the user terminals included in the chat room, the social media providing server may request the partitioned pieces of the closed sharing information from the user terminals. The social media providing server may receive the partitioned pieces of the closed sharing information from the user terminals included in the chat room, and may restore the closed sharing information based on the partitioned pieces. The social media providing server may receive encryption keys along with the partitioned pieces from the user terminals included in the chat room, may decrypt the partitioned pieces, and may restore the sharing information.

Figure 12:
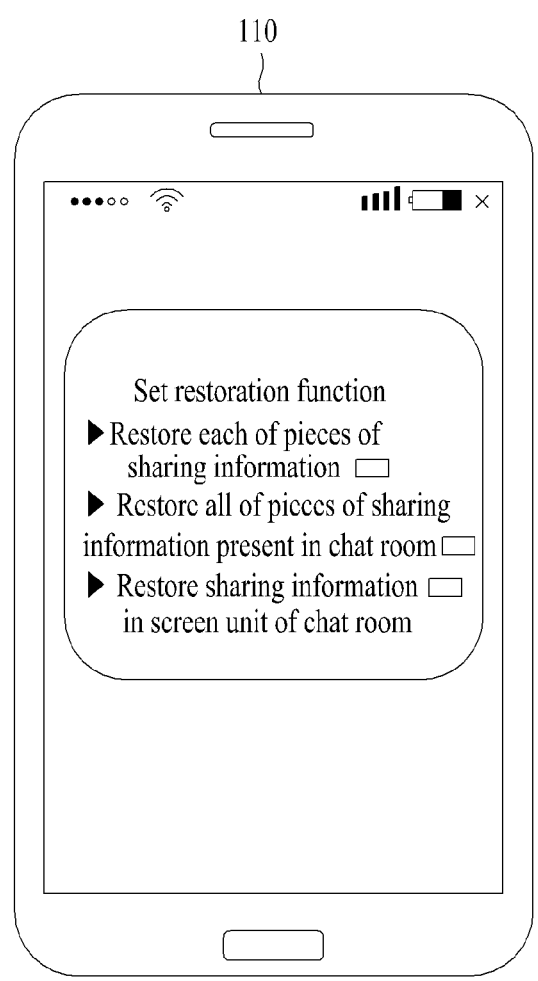
FIG. 12 is an example showing a user interface in which a restoration function for sharing information is set in a user terminal according to an embodiment.
Figure 13A:
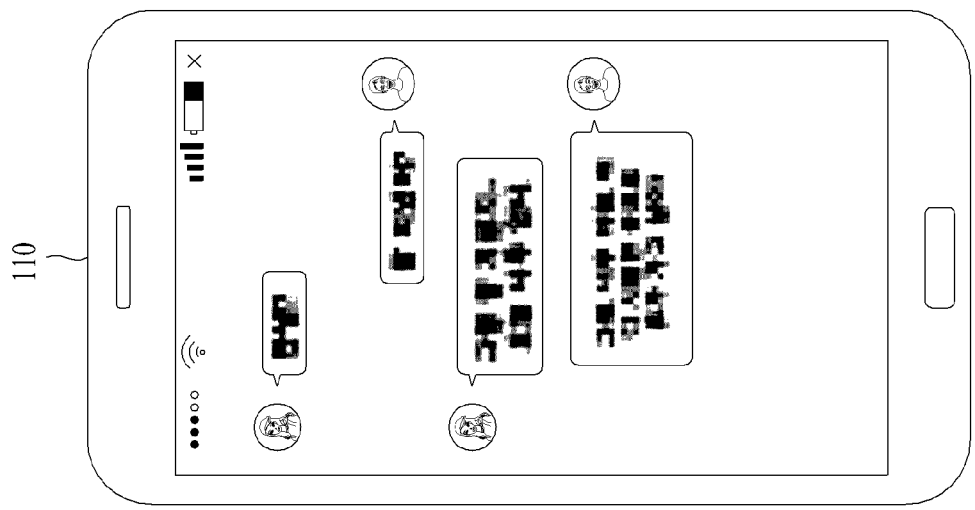
FIG. 13A is an example showing blur-processed sharing information in a user terminal according to an embodiment.
Figure 13B:
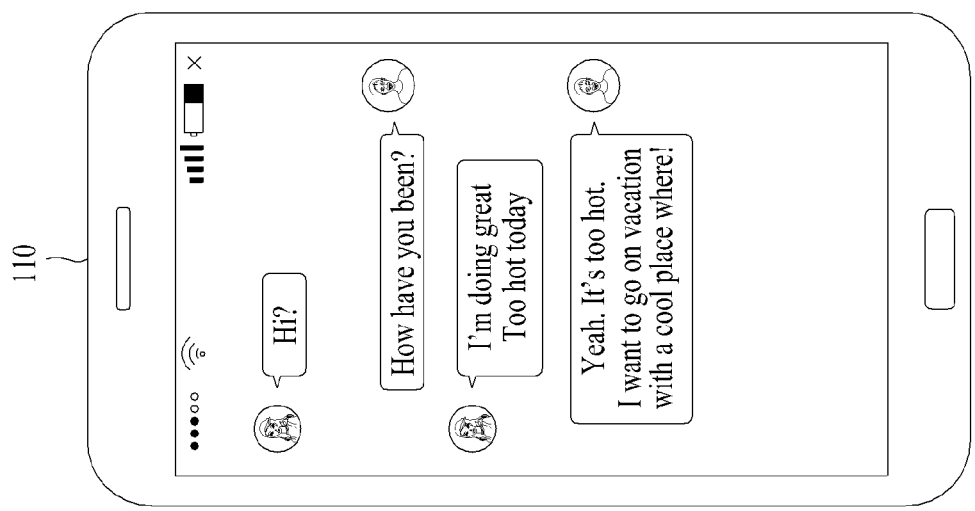
FIG. 13B is another example showing blur-processed sharing information in a user terminal according to an embodiment.
Figure 13C:
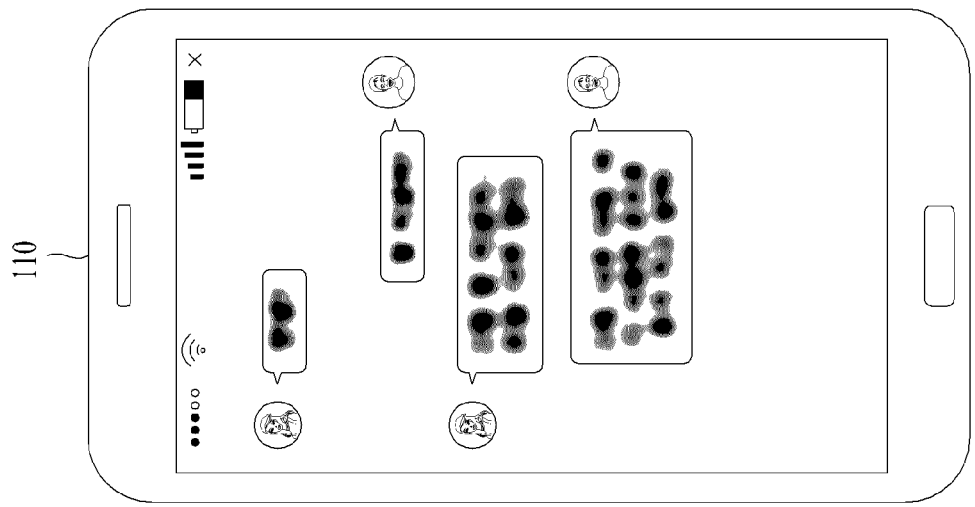
FIG. 13C is another example showing blur-processed sharing information in a user terminal according to an embodiment.
Figure 13D:
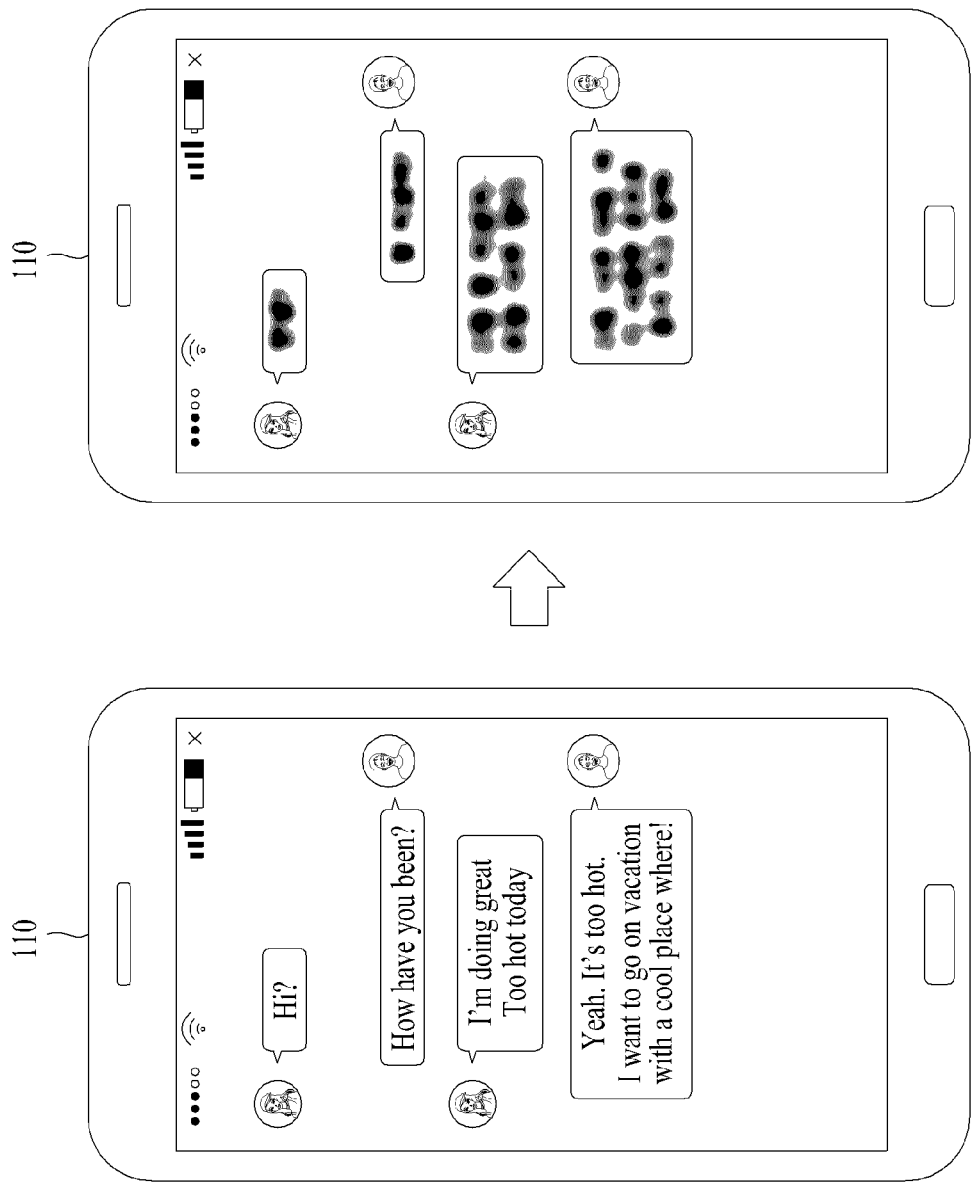
FIG. 13D is another example showing blur-processed sharing information in a user terminal according to an embodiment.

FIG. 12 shows an example of a user interface in which a restoration function for sharing information is set in a user terminal. For example, the social media providing server may provide a user interface in which a restoration function for sharing information is set through social media of a user terminal. In other words, if the social media is a chatting service, the social media providing server may provide a space in which the restoration function for sharing information input in a chat room provided by the chatting service is set. More specifically, the social media providing server may provide the user interface regarding whether each of pieces of sharing information received from the user terminal 110 will be restored, whether all of pieces of sharing information present in the chat room will be restored at once or whether sharing information present in the chat room will be restored in a screen unit. The user terminal 110 may set the function of restoring sharing information through such a user interface. Accordingly, the restoration function may be applied to sharing information input in the chat room.

Figure 10:
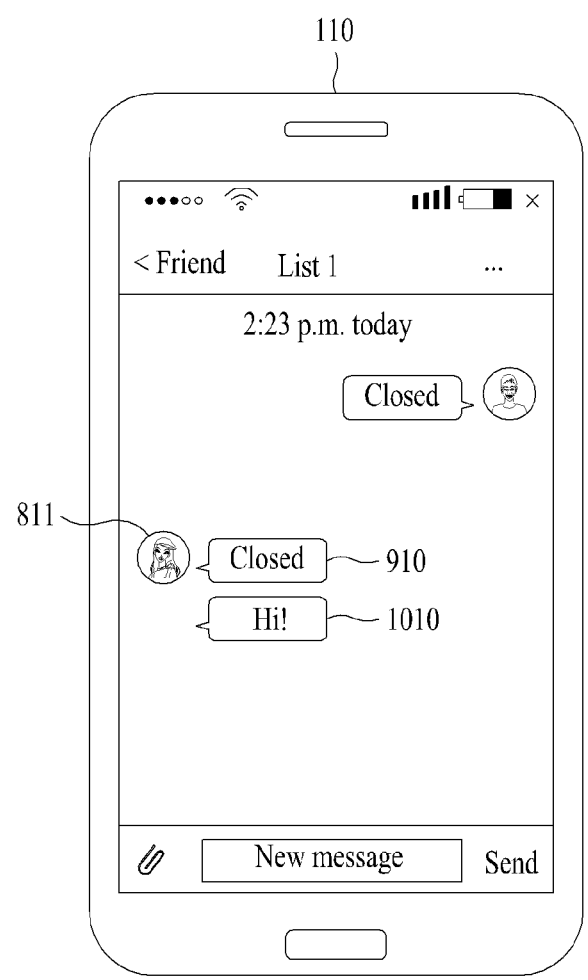
FIG. 10 is another example for illustrating a method of providing social media in a user terminal according to an embodiment.

Referring to FIG. 10, the user terminal 110 may open sharing information 1010 restored from sharing information 910 input by a specific user 811, that is, sharing information whose reading has been requested.

For another example, the past sharing information written in a chat room may be restored in addition to sharing information now transmitted and received in the chat room. In this case, the restored sharing information may be output in a next sequence of sharing information now written in the chat room. Alternatively, time information about sharing information transmitted and received in the chat room may be compared with time information regarding that sharing information has been approved. The sharing information may be output to the chat room in time order.

The apparatus described above may be implemented in the form of a combination of hardware elements, software elements, and/or hardware elements and software elements. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, code, an instruction or one or more combinations of them and may configure the processing device so that it operates as desired or may instruct the processing device independently or collectively. The software and/or data may be interpreted by the processing device or may be embodied in a machine, component, physical device, virtual equipment or computer storage medium or device of any type or a transmitted signal wave permanently or temporarily in order to provide an instruction or data to the processing device. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as CD-ROM or a DVD, magneto-optical media such as a floptical disk, ROM, RAM, or flash memory. Examples of the program instruction may include both machine-language code, such as code written by a compiler, and high-level language code executable by a computer using an interpreter.

The social media providing server according to an embodiment can prevent the leakage of information by preventing sharing information including contents to be protected from being used without others' permission in social media.

The social media providing server according to an embodiment can enhance security by partitioning, distributing, storing and restoring sharing information, such as text data, voice data, a document file, a still image or a moving image transmitted and received in social media.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of providing social media, wherein:
the method being performed by a social media providing server comprising at least one processor configured to execute computer-readable instructions included in memory, the method comprising:
receiving, by the at least one processor, sharing information input from at least one user terminal included in a chat room, wherein a function is applied for processing the sharing information in a closed state so that contents of the received sharing information are not displayed and outputting the processed sharing information to the chat room,
wherein the function is executed when the user terminal which has input the sharing information leaves the chat room;
wherein when the user terminal which has input the sharing information leaves the chat room, processing, by the at least one processor, the received sharing information in the closed state so that the contents of the received sharing information are not displayed by blur-processing the contents of the received sharing information, wherein the received sharing information comprises at least one of a message comprising text data, a document file, a still image, and a moving image;
outputting, by the at least one processor, the processed sharing information to the chat room by displaying the blur-processed sharing information on the chat room;
partitioning, by the at least one processor, the sharing information into pieces based on the number of users included in the chat room;
assigning, by the at least one processor, the partitioned pieces of the sharing information to user terminals included in the chat room, wherein each piece of the sharing information is assigned to each of the user terminals included in the chat room;
receiving, by the at least one processor, a request for a reading of the processed sharing information from a user terminal included in the chat room in response that the blur-processed sharing information on the chat room is selected by the user terminal which has requested the reading of the sharing information;
transmitting a message related to the request for the reading of the sharing information to each of the user terminals included in the chat room;
determining whether approval to the request for the reading of the sharing information has been received from each of the user terminals included in the chat room;
restoring, by the at least one processor, the processed sharing information based on the partitioned pieces of the sharing information received from the user terminals included in the chat room after receiving the approvals to the request for the reading of the sharing information from all of the user terminals included in the chat room; and
transmitting, by the at least one processor, the restored sharing information to the user terminal which has requested the reading of the sharing information, wherein transmitting of the restored sharing information comprises displaying the restored sharing information including not-blurred-processed contents of the sharing information on the chat room,
wherein the assigning of the partitioned pieces comprises:
encrypting each of the partitioned pieces by using a respective encryption key;

transmitting the encrypted pieces of the sharing information to each of the user terminals included in the chat room, wherein the encrypted piece of the sharing information is stored in said each of the user terminals included in the chat room; and storing the respective encryption key in a storage medium of the social media providing server, wherein the respective encryption is not transmitted to the user terminals included in the chat room.

2. The method of claim 1, further comprising generating, by the at least one processor, the chat room by inviting at least one user with which the sharing information is to be shared in the social media when ID information related to each user is received.

3. A social media providing-server comprising a processor and a non-transitory computer-readable memory, the processor is configured to:

receive sharing information input from at least one user terminal included in a chat room, wherein a function is applied for processing the sharing information in a closed state so that contents of the received sharing information are not displayed and outputting the processed sharing information to the chat room, wherein the function is executed when the user terminal which has input the sharing information leaves the chat room, wherein when the user terminal which has input the sharing information leaves the chat room, the received sharing information is processed in the closed state so that the contents of the received sharing information are not displayed by blur-processing the contents of the received sharing information, wherein the received sharing information comprises at least one of a message comprising text data, a document file, a still image and a moving image;

output the processed sharing information to the chat room by displaying the blur-processed sharing information on the chat room;

partition the sharing information into pieces based on the number of users included in the chat room;

assign the partitioned pieces of the sharing information to user terminals included in the chat room, wherein each piece of the sharing information is assigned to each of the user terminals included in the chat room;

receive a request for a reading of the processed sharing information from a user terminal included in the chat room in response that the blur-processed sharing information on the chat room is selected by the user terminal which has requested the reading of the sharing information;

transmit a message related to the request for the reading of the sharing information to each of the user terminals included in the chat room, determine whether approval to the request for the reading of the sharing information has been received from each of the user terminals included in the chat room;

restore the processed sharing information based on the partitioned pieces of the sharing information received from the user terminals included in the chat room after receiving the approvals to the request for the reading of the sharing information from all of the user terminals included in the chat room; and transmit the restored sharing information to the user terminal which has requested the reading of the sharing information wherein the restored sharing information including not-blur-processed contents of the sharing information is displayed on the chat room, wherein the processor is further configured to:

encrypt each of the partitioned pieces by using respective encryption key;

transmit the encrypted piece of the sharing information to each of the user terminals included in the chat room, wherein the encrypted piece of the sharing information is stored in said each of the user terminals included in the chat room; and store the respective encryption key in a storage medium of the social media providing server, wherein the respective encryption is not transmitted to the user terminals included in the chat room.

\* \* \* \* \*